Figure 1:
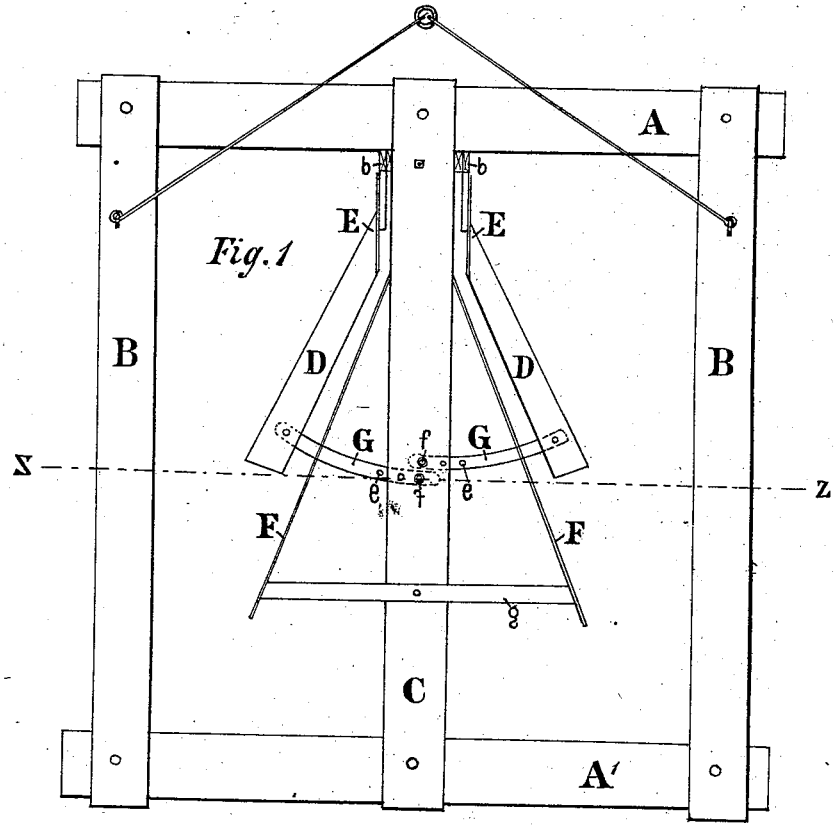

(No Model.)

S. FRENCH.
CULTIVATOR.

No. 289,824. Patented Dec. 11, 1883.

WITNESSES:
E. J. Lane
Geo. C. Wilson

INVENTOR.
Sharon French.
BY John Lane.
ATTORNEY

UNITED STATES PATENT OFFICE.

SHARON FRENCH, OF SILVER LAKE, KANSAS.

CULTIVATOR.

SPECIFICATION forming part of Letters Patent No. 289,824, dated December 11, 1883.

Application filed August 27, 1883. (No model.)

*To all whom it may concern:*

Be it known that I, SHARON FRENCH, a citizen of the United States, residing at Silver Lake, in the county of Shawnee and State of Kansas, have invented certain new and useful Improvements in Cultivators, of which the following is a specification, reference being had to the accompanying drawings.

My invention, which I call a "lister-cultivator," is especially designed for use in cultivating corn or other crops planted in a "valley" between two ridges by the method called "listing," and is designed to be used once or twice for first cultivating while the plants are small.

The object of my invention is to supply an implement that will pulverize the ground, uproot and destroy the weeds on the sloping sides of the ridges, both sides of the valley simultaneously, and at the same time break the clods and sods, destroying the weeds on the top of the ridges, and at the same time to some extent level down the ridges between the rows without liability of covering the small plants growing in the valley between two ridges. Corn planted in the manner called "listing" is in a valley, the center or bottom of the furrow made by the listing-plow throwing its furrow-slice upon either side, forming ridges, and when the plants are very small, at which time it is desirable to begin its cultivation, the weeds will be found along near the center of the sloping sides and on the top of the ridges, where it is difficult to reach them with any of the ordinary cultivators in common use without the loosened soil falling down upon and covering up the tender small plants. My invention, as will be seen, obviates this difficulty, and in effect cultivates "outward" from the plants instead of inward toward them, but is so arranged that the finer portion of the loosened soil is brought back up to the plants simply by its own weight in falling around the knives and under the shields and scrapers, while the coarser portion is carried up the sloping sides and deposited upon the top of the ridges to be broken fine by the clod-breaking plank, as will be hereinafter shown.

Figure 2:
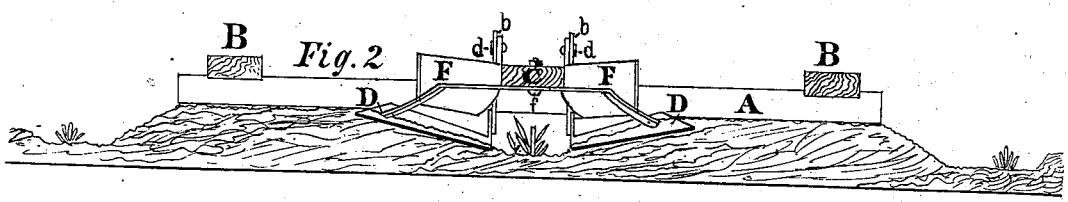
Figure 3:
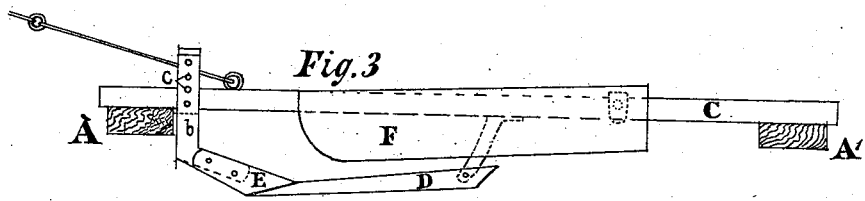

Referring to the accompanying drawings, in which like letters refer to like parts in all the figures, Figure 1 is a top or plan view.
Fig. 2 is a rear view with the rear portion removed, showing from the dotted line $z\ z$ in Fig. 1, and showing the valley and ridges in connection with the cultivator, by which it will be understood how the clod-breaking plank or beams ride the top of the ridges, while the knives loosen the soil on the sloping sides. Fig. 3 is a side elevation with one of the side rails removed, showing the center beam with the knives, protectors and scrapers, and clod-breaking beam in position.

My invention will first be described, and afterward more specially pointed out in the claims, as hereinafter set forth.

My improved cultivator consists of a frame composed of the riding-planks A A′, above which the side rails, B, may be attached to brace the frame, and the center beam, C, to which the knives D and shields or scrapers F are attached, and any convenient means for hitching thereto—as the ordinary V-chain hitch shown—may be used, and a handle also may be attached to the rear end, by means of which the machine may be lifted when necessary to clear it if it should clog. The several parts are arranged substantially as herein shown, for the purpose specified. The riding-planks A are attached below the side rails and rest on the top of the ridges, and, being drawn forward along the surface of the ground, crush and pulverize the clods, and destroy the weeds on the top of the ridges; and, to aid in their doing so, a few sloping teeth may, when so desired, be placed in the rear plank, A′. The beam C may be attached with bolts to the top of the riding-plank A, as shown in the drawings.

D D represent two knives, which may be constructed of thin steel, preferably three inches wide and twenty-four inches long, with a sharp cutting outer edge and set inclined, as listing-plowshares, and their front ends set near and upon either side of the plants, as shown, and thence extending obliquely outward and rearward, to cut outward from the plants, and also extending upward, in that their rear ends are higher up than the front ends, made so to conform to the sloping sides of the ridges, whereby the knives will enter the ground to a uniform depth throughout their length up the sides of the ridges, as will be understood by inspecting the drawings. The front end of the knives may have a lip turned up and formed as a protector or fender, E, for protecting the plants from falling clods let loose by the moving of the plank A. A bar, b, with two or more perforations, c, is made adjustable up and down in its attachment by means of bolts d to the beam C. The said bar b extends down, and is attached to the front end of the knives or to the fender E, by which the forward ends of the knives are held in position and made adjustable up and down. An arm or bracket, G, having two or more perforations, e, is made adjustable by means of the bolt f in its attachment to the beam C. The said bracket extends outwardly, and has its outer end part bent down under the rear end part of the knife, and may be attached thereto by rivets or bolts, by which the rear end of the knives are made adjustable laterally, so as to change the angle set of the knives to work farther from or nearer to the plants, as may be desired.

Two knives, D, are used and set, as shown, to work both sides of the row, as listing-shares, and intended to enter the ground but a short distance, skimming, as it were, the weeds with a thin slice of soil, which in passing over the knife falls to the ground, and behind the knives are shields or scrapers F, having their front end attached to the beam C, and thence extending outwardly a short distance behind the knives, and in about the same angle with the knives as shown in the drawings. The said shields may be braced in any suitable manner from the beam, as shown, by the brace g, and the said shields or scrapers F extend downward, so as to catch falling clods cut by the knives, and may scrape the top surface of the ground and carry the clods up the sloping sides of the ridges to be pulverized by the plank A, while the loosened pulverized soil will pass under the scrapers and a portion of it scatter down the side of the ridge, falling around the plants, as hoeing them in a superior manner, without liability of covering them. The said scrapers F may be curved as moldboards. I prefer to make them straight and set them perpendicular just behind the knives, with sufficient space between that the slice of soil may fall behind to the ground before reaching the scrapers. The said scrapers may be removed and the cultivator used without them after the corn is of sufficient size to allow more dirt to fall about the roots in filling the valley; and the fenders are not a necessity, as they may be dispensed with without departing from my invention, in which case I attach the bar b to the under side of the front end of the knife and set the plank A quite close over the front end of the knife, that falling clods may be caught by the knife and scraper.

In operation the machine is placed so the row of corn comes directly under the beam C, and by drawing it forward the plank A breaks the clods and destroys the weeds on the top of the ridge, the knives cut into and pulverize the soil from the center outward, and the fenders and scrapers prevent too much of the loosened soil falling to the valley to the injury of the small plants.

Having thus set forth my invention, what I claim, and desire to secure by Letters Patent, is—

1. In a cultivator, the combination of a suitable frame provided with the riding-plank A, adapted to ride the ridges on either side of the row, the center beam, C, the knives D, secured to the said beam on opposite sides thereof, and extending rearward, outward, and upward, with the shields or scrapers F, adapted to follow the said knives, sweeping or scraping the sides of the ridges, protecting the plants from falling clods or sods, all constructed and arranged to operate substantially as and for the purpose set forth.

2. In a listing-cultivator provided with a riding-plank, A, adapted to ride the top of the ridges on either side of the row, the beam C, carrying the pair of knives D, adapted to loosen the soil upon both sides of the row simultaneously, the front ends of said knives being set to enter the ground near the plants, and thence extending obliquely rearwardly, outward, and upward, so as to loosen the soil at a uniform depth on the sloping sides of the ridges, all substantially as shown.

3. In a listing-cultivator, the plank A, adapted to ride the top of the ridges, the knives D, adapted to cut and loosen the soil at a uniform depth upon the sloping sides of the ridges, with the scrapers F, arranged at a short distance in the rear of the said knives, so as to sweep falling clods or sods up the sides of the said ridges and away from the plants, combined and arranged to operate substantially as and for the purpose set forth.

SHARON FRENCH.

Witnesses:
L. W. HARDY,
J. M. PETRO.